United States Patent [19]

Allen

[11] Patent Number: 4,513,679

[45] Date of Patent: Apr. 30, 1985

[54] DRAG REDUCING DEVICE FOR BARGES

[76] Inventor: Sebree J. Allen, Rte. #2, Kevil, Ky. 42053

[21] Appl. No.: 574,018

[22] Filed: Jan. 26, 1984

[51] Int. Cl.³ .................................................. B63B 1/38
[52] U.S. Cl. .................................... 114/67 A; 114/271; 114/288; 114/242
[58] Field of Search ............... 114/67 R, 67 A, 288, 114/289, 80, 81, 242, 249, 219, 271; 180/127, 128; 441/22

[56] References Cited

U.S. PATENT DOCUMENTS

| | | | |
|---|---|---|---|
| 661,303 | 11/1900 | Briggs | 114/67 A |
| 3,266,067 | 8/1966 | Windle | 114/67 A |
| 3,473,503 | 10/1969 | Gunther | 114/67 A |

FOREIGN PATENT DOCUMENTS

| | | | |
|---|---|---|---|
| 2253884 | 5/1974 | Fed. Rep. of Germany | 114/219 |
| 388713 | 8/1908 | France | 114/219 |

Primary Examiner—Trygve M. Blix
Assistant Examiner—Thomas J. Brahan
Attorney, Agent, or Firm—Harrington A. Lackey

[57] ABSTRACT

A drag reducing device for barges including a flexible mat carrying a plurality of transversely spaced, elongated flexible tubular air passages open at the top and bottom, suspended from one end of a barge, extending transversely of the barge and adapted to swing longitudinally of the barge as the barge moves longitudinally through a body of water, whereby air from the atmosphere is conducted through the tubular air passages to an area beneath the barge.

The drag reducing device is particularly adapted for suspension between the adjacent ends of a pair of barges connected in tandem so that the flexible mat and tubular members swing in a trailing longitudinal direction to direct air beneath the bottom surface of the trailing barge.

7 Claims, 5 Drawing Figures

DRAG REDUCING DEVICE FOR BARGES

BACKGROUND OF THE INVENTION

This invention relates to a drag reducing device for a marine vessel, and more particularly to a drag reducing device for barges.

Because of the simplistic, bulky, flat design of barges, their movement through the water creates considerable drag. Since it is customary to move multiple numbers of barges through the water at one time, usually in tandem, by a single tow boat, the cumulative effect of the drag created by all of the barges requires considerable power, not only to force the water away from the path of each barge, but also to overcome the total drag created by all of the barges.

Drag reducing devices for marine vessels, of a type which directs air from the atmosphere to areas beneath and alongside the vessel to reduce friction, are known in the art, as illustrated in the following U.S. Pat. Nos.:

| | | |
|---|---|---|
| 312,500 | Owen | Feb. 17, 1885 |
| 955,703 | Settergren | Apr. 19, 1910 |
| 1,398,246 | Trask | Nov. 29, 1921 |
| 1,591,748 | Dieckmann | Jul. 6, 1926 |
| 1,621,625 | Casey | Mar. 22, 1927 |
| 2,378,822 | Barry | Jun. 19, 1945 |
| 2,727,486 | Dunning | Dec. 20, 1955 |
| 3,084,651 | Parmenter | Apr. 9, 1963 |

All of the above patents, except the Dieckmann patent, disclose the discharge of air along the surface of the hull of the boat. The Dieckmann patent discloses the discharge of water along the sides of a boat.

The Parmenter U.S. Pat. No. 3,084,651 discharges air beneath the hull of the boat primarily for the purpose of reducing the sound energy transmitted from the vessel to the surrounding water.

The Owen, Settergren, Barry and Dunning patents disclose devices receiving air from the atmosphere as the boat moves through the water, and conveying the air below the water surface and along the hull surface, to reduce the frictional resistance of the water along the surface of the hull, and/or to reduce the vacuum created by the movement of the hull through the water.

The Casey U.S. Pat. No. 1,621,625 discloses a plurality of air conduits extending substantially parallel along the bottom of a flat-bottom vessel, or barge, to provide an air sheet between the water and the hull surface to reduce water friction, and also to provide some forward propulsion for the barge.

However, none of the above patents disclose a drag reducing device including air passages from the atmosphere to areas beneath the vessel, which is freely suspended for swinging beneath a trailing vessel or barge connected in a tandem of barges, when the barges are moving through a body of water.

SUMMARY OF THE INVENTION

It is therefore an object of this invention to provide a drag reducing device particularly adapted for barges connected in tandem to reduce the drag on the trailing barge.

The drag reducing device made in accordance with this invention includes a flexible mat, carrying vertically disposed transversely spaced air conduits, suspended between the adjacent ends of a pair of barges in tandem, so that the mat is free to swing beneath either barge, depending upon the longitudinal direction of movement of the barges through the water.

Moreover, the mat and air conduits are preferably flexible and extend substantially below the level of the bottom surface of the dredges. Thus, when the barges are in motion, the mat and air conduits swing in a trailing direction opposite to the direction of movement of the barges. As the flexible mat engages the bow or end portion of the trailing barge, the conduits flex about the bottom edge of the barge so that the conduits are directed in a generally horizontal direction, or substantially parallel to the bottom surface of the barge, to direct the flow of air beneath and adjacent to the bottom surfaces of the barge in a trailing direction. This trailing flow of air or air bubbles provides an aerated curtain along the bottom surface of the trailing barge to reduce the skin friction between the bottom surface and the water over which the dredge moves. Moreover, the air curtain provides to some extent, additional propulsion for the barge, as well as a lifting effect produced by the myriads of air bubbles.

The drag reducing mat made in accordance with this invention is provided with a transverse rigid header member for maintaining the rigidity of the top edge of the mat as well as uniform spacing for the upper portions of the air conduits. The rigid header is suspended from one end of either adjacent barge by brackets secured to the barge by appropriate fasteners. The brackets are coupled by flexible connecting means, such as cables, ropes or lashings, to the header to freely suspend the mat vertically and transversely between a pair of adjacent barges in tandem. Because of the free suspension of the mat and the air conduits, movement of the barges in either longitudinal direction will cause the mat to swing in the opposite direction against the trailing barge.

Preferably, a drag reducing mat made in accordance with this invention is suspended between each pair of adjacent barges in tandem. No adjustment has to be made to the mats in order to permit each mat to perform its drag reduction function, regardless of the longitudinal direction of movement of the barges.

DESCRIPTION OF THE PREFERRED EMBODIMENT

Figure 1:
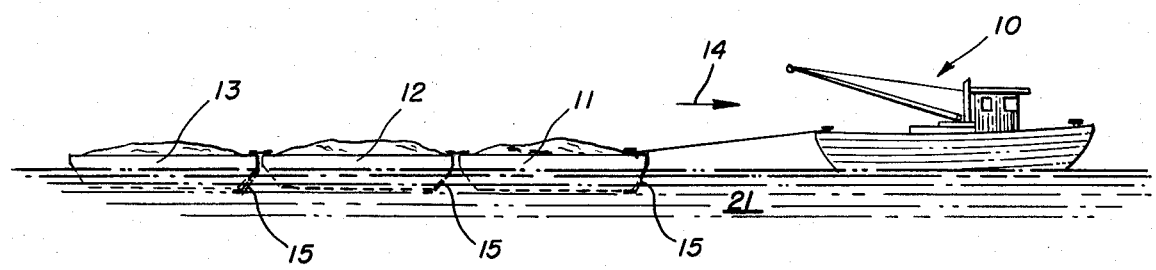
FIG. 1 is a side elevational view of a tow boat pulling three barges connected together in tandem, with a mat suspended from the leading end of each barge, in operative position.

Referring now to the drawings in more detail, FIG. 1 discloses a typical tug boat or tow boat 10 towing a series of three barges 11, 12 and 13 coupled in tandem, and moving in a leading or forward longitudinal direction indicated by the arrow 14. Mounted upon the bow or leading end of each of the barges 11, 12 and 13 is a drag reducing device 15, made in accordance with this invention.

Each barge 11, 12 and 13 is typically of rectangular crosssection in plan view, having a pair of opposite side walls 16. Each of the end portions of the respective barges 11–13 has an upper substantially vertical end wall 17 and an inwardly declining or raked end portion 18. Since the end portions of each barge is identical, either end portion may function as a bow or a stern, depending upon the direction of longitudinal movement of the particular barge 11–13. Each of the barges 11, 12 and 13 has a flat bottom with an outer bottom surface 20.

Each of the drag reducing devices 15 comprises an elongated mat 22 having a longitudinal transverse dimension substantially the same as the transverse dimension of each barge 11–13 and a depth-wise dimension from top to bottom.

Each mat 22 carries or supports a plurality of elongated tubular members or conduits 23, each defining an elongated air passage 24 having a top opening 25 and a bottom opening 26, to permit the free passage of air entirely through the length of each tubular member 23. The tubular members 23 may be fixed to the mat 22 in any desired manner so that they are transversely, and preferably uniformly, spaced along the length of the mat 22 with their top openings 25 and bottom openings 26 preferably coterminous with the top and bottom edges of the mat 22.

Figure 5:
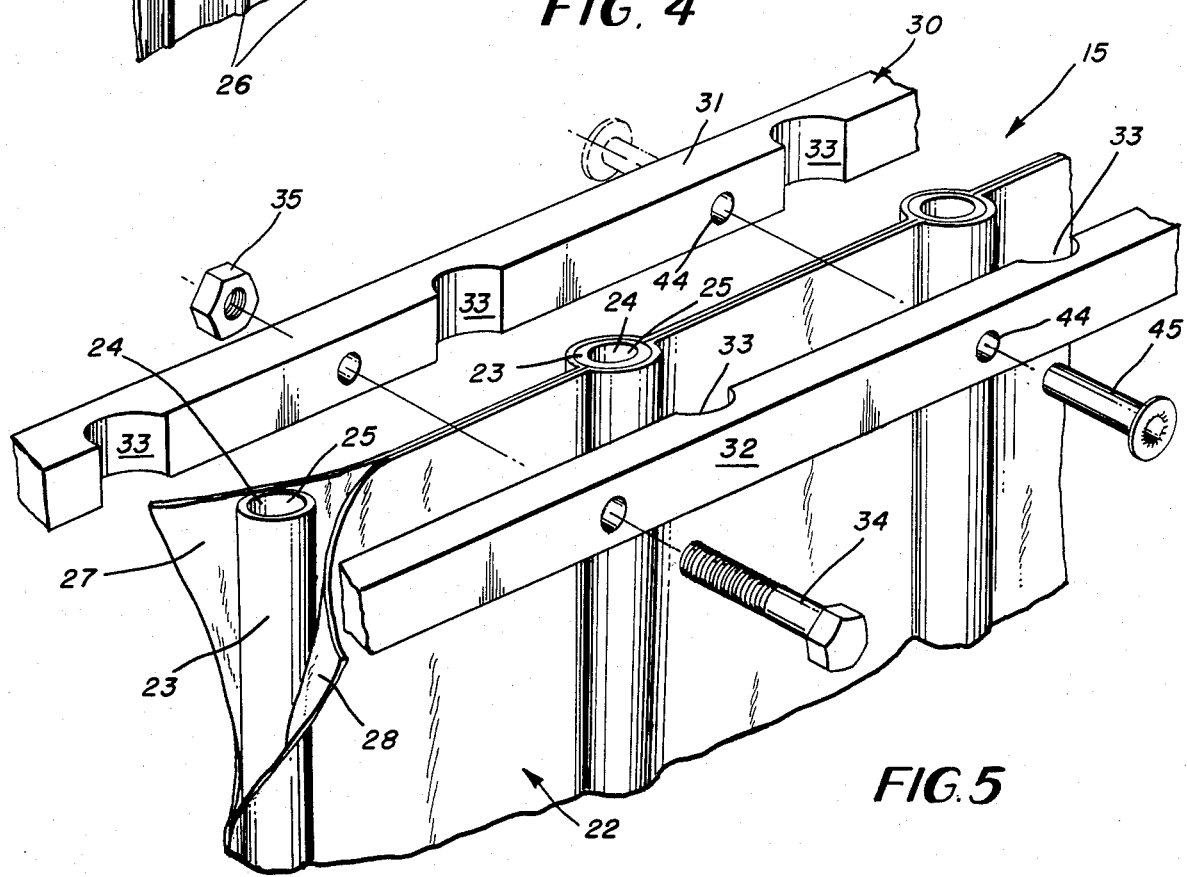
FIG. 5 is a much enlarged, fragmentary perspective view of a drag reducing mat, made in accordance with this invention, with the laminations of the web separated to show the construction of the mat, and with the header bar assembly shown in an exploded view.

In a preferred form of the device 15, as best disclosed in FIG. 5, the tubular members 23 are sandwiched between a pair of laminated membranes or webs 27 and 28, forming the mat 22.

The upper or top edge portions of the mat 22 and the tubular members 23 are held in a rigid position by a header member 30, preferably including a pair of clamp bars 31 and 32. Each clamp bar 31 and 32 is provided with opposed arcuate recesses 33 receiving the upper portions of the tubular members 23 between the laminated membranes 27 and 28. The clamp bars 31 and 32 are held in rigid clamped position by any convenient type of fasteners, such as the bolts 34 and nuts 35, (FIG. 5).

Figure 4:
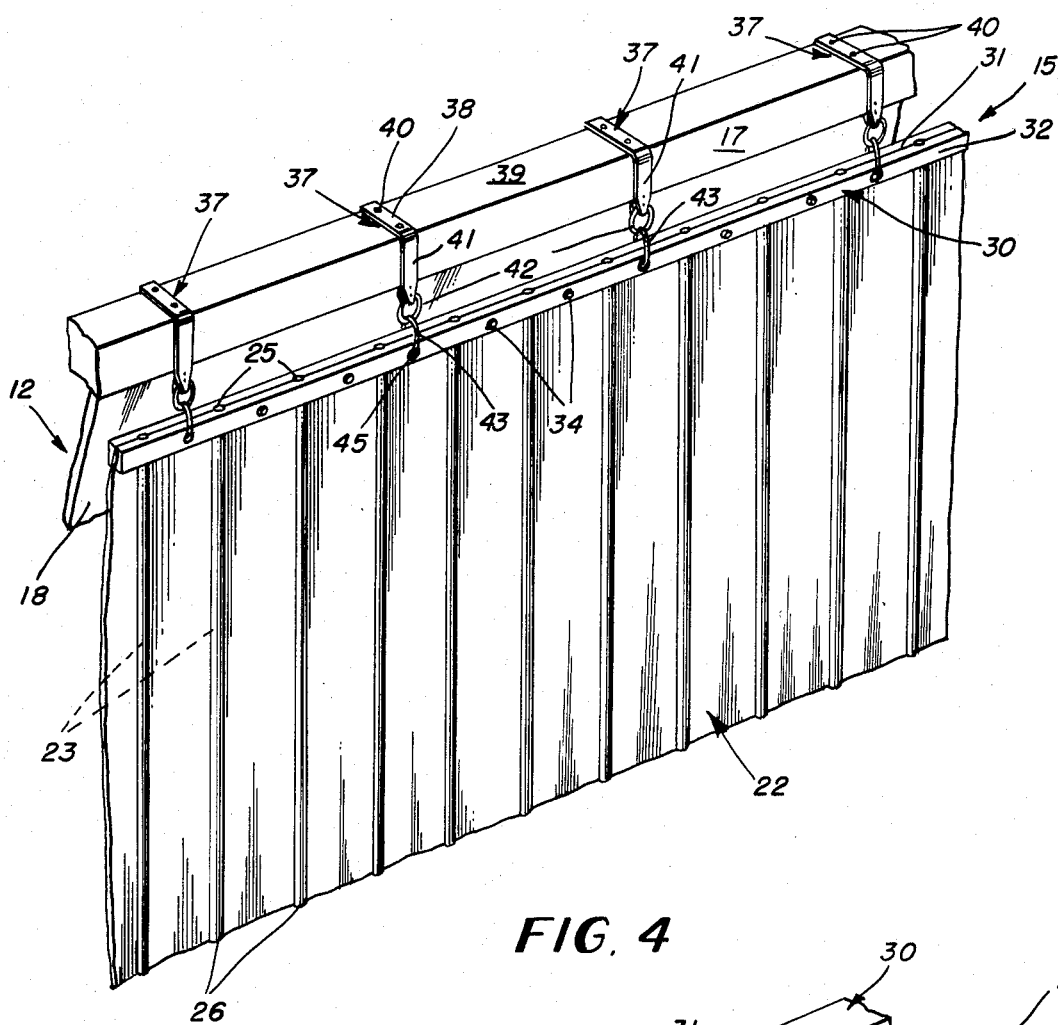
FIG. 4 is an enlarged, perspective view of a mat, shown fragmentarily, attached to one end portion of a barge, also shown fragmentarily, freely suspended in an inoperative position.

Attachments are provided for freely suspending the mats 22 transversely between adjacent end walls 17 of barges 11, 12 and 13 connected in tandem. The particular attachment means disclosed in the drawings includes a plurality of angle brackets 37 which fit snugly against the top end edge of a barge, such as the barge 12 (FIG. 4). The horizontal leg 38 of each angle bracket 37 is secured flush against the deck surface 39 by fasteners, such as cap screws 40. The vertical legs 41 of each angle bracket 37 fit flush against the upper end wall 17. The lower end portion of each vertical leg 41 is provided with an opening for receiving an eyelet 42, which in turn is connected to a lashing loop 43 extending throuoh the opposed lashing holes 44 in the clamp bars 31 and 32. Each clamp hole 44 is lined with an elongated tubular ferrule 45 (FIG. 5), if desired.

Figure 2:
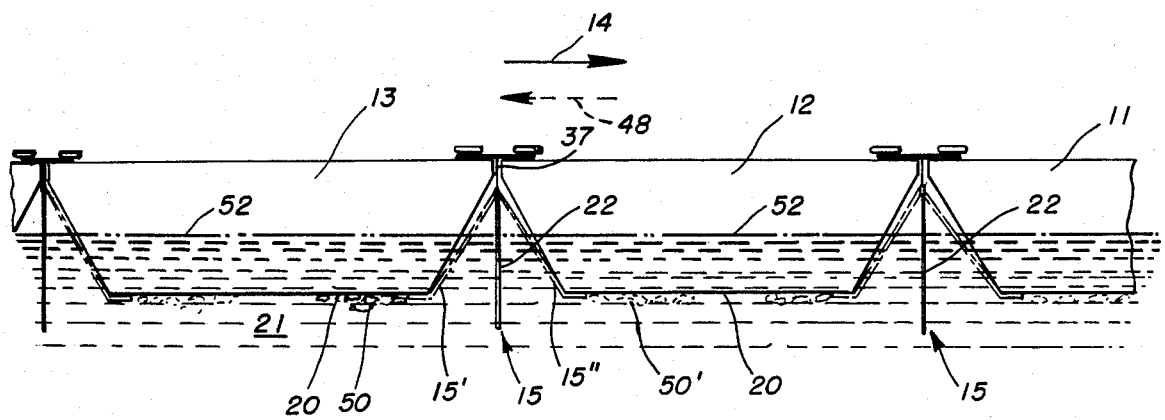
FIG. 2 is an enlarged, fragmentary, side elevational view of four barges connected in tandem at rest in a body of water, with a mat made in accordance with this invention suspended between each pair of barges in an inoperative position in solid lines, and in both trailing positions, in phantom.

With the header member 30 freely suspended by the lashings 43 from the angle brackets 37 fixed to one end of the dredge 12, the mat 22 normally hangs in a substantially vertical plane extending transversely of the barge 12, when there is no movement by the barge 12. The inoperative vertical position of the mat 22 is disclosed in FIGS. 2–4, in solid lines. In the inoperative position, the bottom edge of the mat 22 is located substantially below the plane of the bottom surfaces 20 of the barges 11 and 12 (FIG. 3).

Preferably, the laminated webs 27 and 28 as well as the tubular members 23 are made of flexible material.

Figure 3:
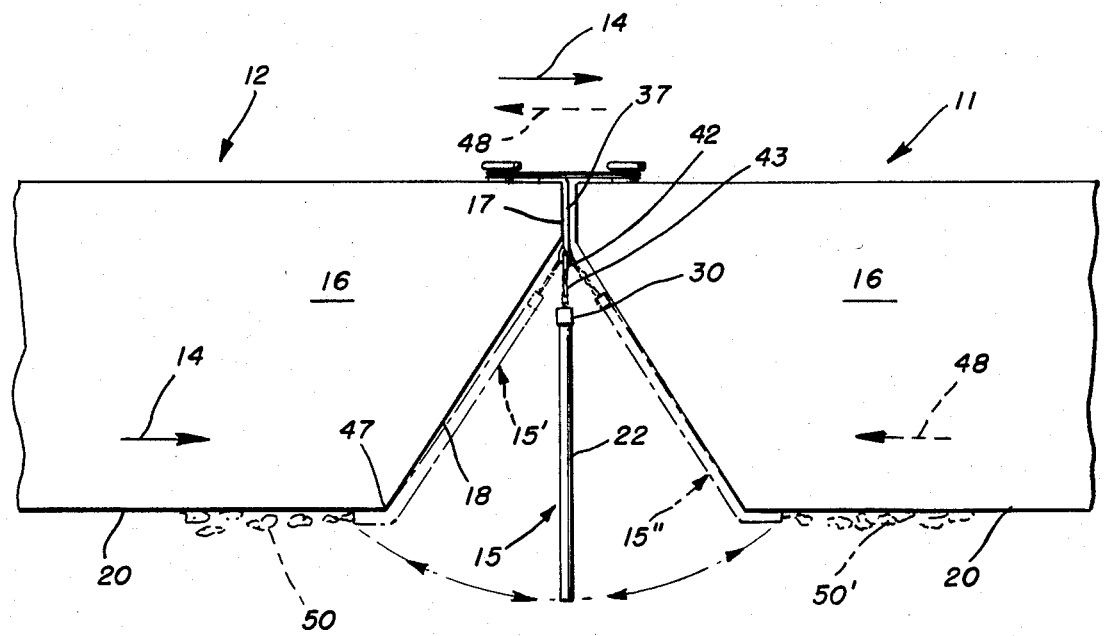
FIG. 3 is an enlarged, fragmentary, side elevational view of a pair of barges connected in tandem with a mat fixed to one end of one of the barges in a vertical inoperative solidline position, and in both trailing positions, in phantom.

When the barge 12 is moving forwardly, or in the direction of the solid-line arrow 14, the water forces the mat 22 to swing rearwardly, or in a trailing direction opposite from the movement of the barge 12, to an ultimate trailing position as disclosed by the phantom line 15' in FIG. 3. In the trailing position 15', the lower ends of the mat 22 and the tubular members 23 are flexed or bent about the leading bottom edge 47 of the barge 12 (FIG. 3) by the force of the water, to direct the bottom portions of the tubular members 23 in a substantially horizontal trailing position, as disclosed in FIG. 3. The upper open ends 25 of the air passages 24 capture air in the atmosphere by virtue of their tilted attitude in the direction of the arrow 14. The captured air is forced downward and rearwardly through the air passages 24 by the compression of the captured air moving toward and against the ambient atmosphere, and by the reduced pressure created beneath the bottom surface 20 drawing the air downward and rearward through the tubular members 23. The air is discharged through the open bottom ends 26 of the tubular members 23 in the direction of the broken arrow 48 along the bottom surface 20, to create a layer or curtain of air bubbles 50. The layer of air bubbles 50 reduces the amount of water that comes in contact with the bottom surface 20, thereby reducing the skin friction between the bottom surface 20 and the body of water through which the barges are moved. Moreover, the layer of air bubbles 50 provides a cushion of bouyancy as well as a jet stream propelled in a trailing direction which lends some assistance to the propulsion of the barge 12 in the leading direction of the arrow 14.

Without modifying or adjusting the drag reducer device 15 in any way, the device 15 functions equally well to direct a layer of air bubbles 50' beneath the bottom surface 20 of the adjacent barge 11 (FIG. 3), when the barges 11 and 12 are moving in the opposite longitudinal direction, that is the direction of the broken arrow 48. The position of the drag reducer device 15 in this reverse attitude is shown by the position 15" in phantom in FIGS. 2 and 3.

Thus, the drag reducer device 15, by virtue of its flexible construction and flexible suspension from either adjacent end of a pair of barges 11 and 12 in tandem, functions equally well to minimize the drag beneath whichever barge 11 or 12 constitutes the trailing barge when the barges 11 and 12 are moving optionally in either longitudinal direction 14 or 48.

It will be understood that other attachment means may be utilized for suspending the mat 22 with its transversely spaced air passages 24 from the corresponding end of a barge 11, 12 or 13.

In the tandem barge arrangement disclosed in FIG. 3, it is immaterial whether the brackets 37 are secured to the end of the barge 12 or the barge 11.

The relative dimensions of the angle brackets 37, eyelets 42, lashings 43, header member 30 and mat 22 are such that the top openings 25 of the air passages 24 are located above the water line 52 of the barges 11, 12 and 13, whether the barges 11–13 are empty or loaded, and preferably below the intersection of the upper end wall 17 and the raked end portion 18. Furthermore, as previously mentioned, the height of the mat 22 is great enough to deploy the bottom openings 26 of the air passages 24 below the water line 52, below the bottom surfaces 20 of the respective barges, and low enough to permit flexing of the tubular members 23 about the front bottom corner of the respective barges, so that the bottom portions of the tubular members 23 can be directed along ahd substantially parallel to their respective bottom surfaces 20.

A shorter mat 22 in which the bottom openings 26 are above the bottom surface 20 would cause the air discharged from the tubular members 23 to impinge against the bow or leading raked end portion 18 in an area of relatively high pressure and minimal suction. In other words, the raked end portion would tend to resist the discharge of air directed toward it to produce an ineffectual drag reducing function.

It is therefore apparent that a drag reducing device 15 has been designed which is particularly adaptable for reducing the drag of barges, particularly barges connected in tandem and regardless of the direction of movement of the barges, as well as a drag reducing device which is more versatile in directing air from above the surface of the water to the surfaces beneath the bottom wall of a single barge or trailing barges in a tandem arrangement.

What is claimed is:

1. A drag reducing device for an elongated barge having a transverse dimension, an end portion, a bottom surface, and a draft line, and adapted to move longitudinally through a body of water, comprising:
   (a) a mat having a transverse dimension and a depthwise dimension and transverse top and bottom edge portions,
   (b) a plurality of elongated air conduits carried by said mat and extending from said top edge portion to said bottom edge portion, and transversely spaced along said mat,
   (c) each air conduit having a top opening and a bottom opening,
   (d) attachment means suspending said top edge portion of said mat from the end portion of a barge, so that said mat hangs transversely of the barge for free-swinging movement longitudinally of the barge, said top openings being above the draft line and the bottom openings beinq below the bottom surface of the barge, whereby movement of the barge in one longitudinal direction in a body of water causes said mat to swing in an opposite longitudinal direction.

2. The invention according to claim 1 in which said mat is a flexible membrane and said elongated air conduits comprise elongated flexible tubular members fixed to said membrane.

3. The invention according to claim 2 further comprising an elongated rigid header member fixed transversely along said top edge portion of said mat to hold the top edge portion of said mat rigid and to hold the upper portions of said tubular members transversely spaced apart.

4. The invention according to claim 3 in which said attachment means comprises bracket means fixed to one end portion of a barge and further comprising flexible connector means connecting said bracket means to said header member to suspend said mat from the barge.

5. The invention according to claim 4 in which said header member comprises a pair of elongated clamp bars, and fastener means securing said clamp bars on opposite sides of the top edge portion of said mat and on opposite sides of the upper portions of said tubular members.

6. The invention according to claim 1 in which a pair of barges are connected longitudinally in tandem and have adjacent end portions, said attachment means suspending said top edge portion of said mat from one of said end portions whereby said mat is suspended transversely between the adjacent end portions of said barges, whereby movement of the barges in either longitudinal direction will cause said mat to swing in the opposite longitudinal direction toward the trailing barge.

7. The invention according to claim 6 in which the depthwise dimension of said mat and said tubular members is such that the bottom edge portions of said mat and said tubular members extend beneath the bottom surface of the trailing barge sufficiently to cause said tubular members to flex below the bottom surface of a trailing barge, to discharge air in a trailing direction beneath the bottom surface of the trailing barge when said barge is moved longitudinally in a leading direction.

* * * * *